(12) United States Patent
Tazaki

(10) Patent No.: US 7,030,872 B2
(45) Date of Patent: Apr. 18, 2006

(54) IMAGE DATA EDITING

(75) Inventor: Akemi Tazaki, Outremont (CA)

(73) Assignee: Autodesk Canada Co., Montreal (CA)

( * ) Notice: Subject to any disclaimer, the term of this patent is extended or adjusted under 35 U.S.C. 154(b) by 304 days.

(21) Appl. No.: 10/119,116

(22) Filed: Apr. 9, 2002

(65) Prior Publication Data

US 2002/0154140 A1    Oct. 24, 2002

(30) Foreign Application Priority Data

Apr. 20, 2001  (GB) .................................. 0109741

(51) Int. Cl.
*G06T 1/00*       (2006.01)
*G06F 15/00*    (2006.01)
*G11B 27/00*   (2006.01)

(52) U.S. Cl. .................. 345/418; 715/500.1; 715/716; 715/723; 715/726

(58) Field of Classification Search ................ 345/723, 345/726, 418, 619; 715/500.1, 716, 720–726, 715/731
See application file for complete search history.

(56) References Cited

U.S. PATENT DOCUMENTS

| | | | |
|---|---|---|---|
| 4,937,685 A | | 6/1990 | Barker et al. |
| 5,353,391 A | * | 10/1994 | Cohen et al. ................ 345/619 |
| 5,440,348 A | * | 8/1995 | Peters et al. ................. 348/593 |
| 5,519,828 A | * | 5/1996 | Rayner ........................ 715/835 |
| 5,675,752 A | * | 10/1997 | Scott et al. .................. 715/723 |
| 5,818,542 A | | 10/1998 | Harnois |
| 5,892,506 A | | 4/1999 | Hermanson |
| 6,084,588 A | | 7/2000 | De Haan |
| 6,204,840 B1 | * | 3/2001 | Petelycky et al. ....... 345/723 X |
| 6,269,180 B1 | | 7/2001 | Sevigny |
| 6,473,094 B1 | * | 10/2002 | Sheasby et al. ............. 345/619 |
| 2001/0036356 A1 | * | 11/2001 | Weaver et al. .......... 345/723 X |

* cited by examiner

*Primary Examiner*—Amr A. Awad
*Assistant Examiner*—Chante Harrison
(74) *Attorney, Agent, or Firm*—Gates & Cooper LLP

(57) ABSTRACT

A computer based image data processing system reads image data from a framestore and processes this data in response to user commands. In order to effect these commands the user is provided with a graphical user interface. In the interface a first region is displayed in which a number of clips representing an output sequence are represented by clip regions on a timeline, along with transitions between the clips which are represented by edit regions. The interface also displays a pointer that is arranged to move over the timeline, and a second region representing input controls. The controls relate to transition operations when the pointer is located over an edit region, and relate to other functions when the pointer is not located over an edit region.

20 Claims, 14 Drawing Sheets

IMAGE DATA EDITING

CROSS REFERENCE TO RELATED APPLICATIONS

This application claims the benefit under 35 U.S.C. §119 of the following co-pending and commonly-assigned patent application, which is incorporated by reference herein:

United Kingdom Patent Application Number 01 09 741.9, filed on Apr. 20, 2001, by Akemi Tazaki, entitled "IMAGE DATA EDITING".

This application is related to the following commonly-assigned patents and co-pending patent application, which are incorporated by reference herein:

U.S. Pat. No. 5,892,506, filed on Mar. 18, 1996 and issued on Apr. 6, 1999, by David Hermanson, entitled "MULTI-RACK ARCHITECTURE FOR COMPUTER-BASED EDITING OF MULTIMEDIA SEQUENCES", U.S. Pat. No. 5,818,542, filed on Apr. 10, 1996 and issued on Oct. 6, 1998, by Stephane Robert Harnois, entitled "PROCESSING IMAGE DATA", U.S. Pat. No. 6,084,588, filed on Apr. 8, 1997 and issued on Jul. 4, 2000, by Gisbert De Haan, entitled "INTERACTION BETWEEN MOVING OBJECTS AND MATTE DERIVED FROM IMAGE FRAMES", which application claims priority to United Kingdom Patent Application No. 9607649 filed on Apr. 12, 1996;

U.S. Pat. No. 6,269,180, filed on Apr. 9, 1997 and issued on Jul. 31, 2001, by Benoit Sevigny, entitled "METHOD AND APPARATUS FOR COMPOSITING IMAGES", which application claims priority to United Kingdom Patent Application 9607633, now British Patent No 2 312 124; and U.S. patent application Ser. No. 08/843,282, filed on Apr. 14, 1997, by Raju C. Bopardikar et al., entitled "VIDEO STORAGE", which application claims priority to U.S. Provisional Patent Application Ser. No. 60/015,468 filed on Apr. 15, 1996 and United Kingdom Patent Application 96 19120 filed on Sep. 12, 1996, now British Patent No. 2 312 319.

BACKGROUND OF THE INVENTION

1. Field of the Invention

The present invention relates to image data editing and in particular to an apparatus having frame storage means, processing means, manually operable input means and display means.

2. Description of the Related Art

Computerised video or digitised film editing environments are known. In some of these environments, edit decisions are made based on a compressed version of the source material. In alternative environments, online editing is performed on the full bandwidth source material itself. An environment of this type is licensed by the present assignee under the Trademark "FIRE".

To facilitate editing activities, it is known to display timelines to an editor, such as those described in U.S. Pat. No. 5,892,506 assigned to the present Assignee.

Computerised systems and computer programs for performing effects upon clips of image frames are known. For example, a dissolve effect is described in U.S. Pat. No. 5,818,542 assigned to the present Assignee. An effect for the matching of film like grain upon video material is described in British Patent No. 2 312 124 (U.S. Pat. No. 08/827,641) assigned to the present Assignee. An effect for allowing three dimensional particles to interact with two dimensional video material is described in U.S. Pat. No. 6,084,588 assigned to the present Assignee. Many other effects are also implemented in software licensed by the present assignee under the Trademark "FLAME".

A culture has been established in which computerised editing activities and computerised effects processing activities are perceived as separate activities. Consequently, established platforms provide for effects processing to be implemented or, alternatively, provide for editing activities to be implemented. Consequently, during an editing operation, it is difficult for an editor to make any changes or place any constraints upon effects that have been implemented within particular clips.

BRIEF SUMMARY OF THE INVENTION

According to a first aspect of the present invention, there is provided image data editing apparatus, comprising frame storage means storing a plurality of clips, processing means, manually operable input means and display means, wherein said display means is configured to display: (a) a first region in which a plurality of said clips representing an output sequence are represented by clip regions on a timeline, and transitions between said clips are represented by edit regions; (b) a pointer configured to be moveable over said timeline, (c) a second region representing input controls, wherein said controls relate to transition operations when said pointer is located over an edit region, and said controls relate to other functions when said pointer is not located over an edit region.

In a preferred embodiment the second region represents a portion of the first region and shows individual frames of the output sequence. Preferably, the display means is configured to move the pointer over the timeline when the output sequence is being played, and the pointer is located when the output sequence stops being played, and the output sequence is stopped by inputs received at said manually operable input means.

Preferably, the pointer is moved and located in response to inputs received at the manually operable input means. Preferably the first region comprises a plurality of timelines; the apparatus is configured to receive a manual input identifying a selection of one of said timelines, and the pointer is located by said selection of one of said timelines.

BEST MODE FOR CARRYING OUT THE INVENTION

FIG. 1

Figure 1:
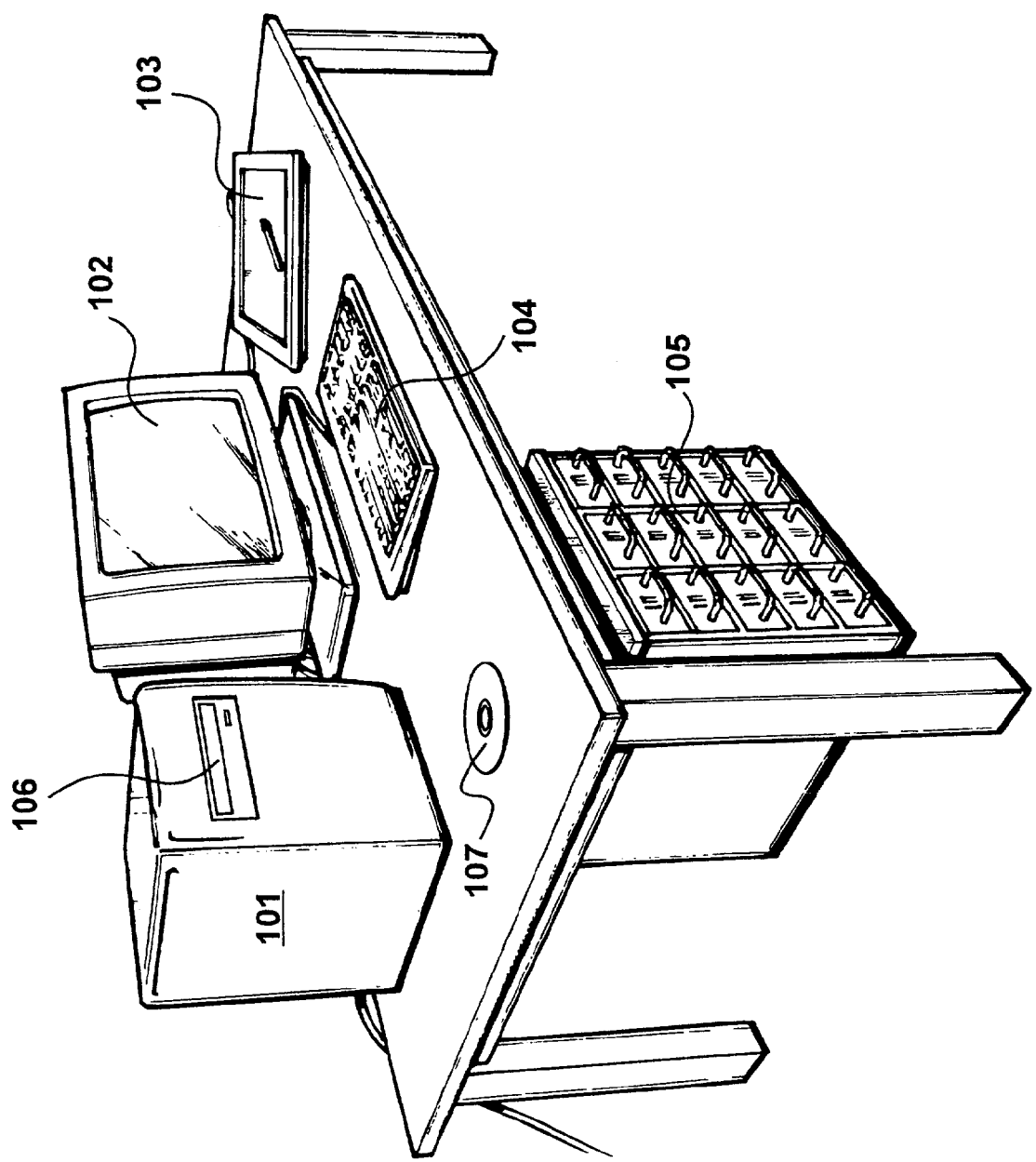
FIG. 1 shows a system for editing image data.

A system for editing image data is illustrated in FIG. 1. The system includes a computer 101 configured to display video output via a monitor 102. The computer runs applications software that facilitates the editing and image processing operations and monitor 102 provides a graphical user interface to a user, allowing film or video clips to be previewed and edited by the definition of timelines.

The graphical user interface provides the user with several controls and interfaces for controlling the manipulation of image data. The system also includes a graphics tablet 103, to allow the user to interact with a graphical user interface and a keyboard 104 to facilitate alpha numeric input.

The system further comprises a disk based frame storage system 105, referred to herein as a Framestore. In preparation for image editing and manipulation, images from one or more film or video input reels are transferred to the framestore 105 via a digital tape player or film scanning apparatus etc.

Framestore 105 may be of the type supplied by the present assignee under the Trademark "STONE" and includes several high capacity hard disk drives arranged to supply and store image data in parallel across many individual drives at once. The drives are configured as a redundant array of inexpensive disks (RAID). Further details of the RAID system are disclosed in British Patent No 2 312 319 (U.S. Ser. No. 08/843,282) assigned to the present Assignee.

From the framestore 105 it is possible to play back and record high resolution film images or video images at any location in a clip without having to wait for a tape mechanism to rewind to reach a required frame position, thereby facilitating a process known as non linear editing.

In a typical application, film clips are digitised and stored on digital tape for transfer to the framestore 105. The clips include several camera shots that are to be combined into the same scene. In addition, effects are to be performed and, increasingly, it has been appreciated that the nature of effects and their combination within the editing activity forms part of the overall artistic effect. In particular, the integrity of an effect, i.e. the extent to which it is perceived to be real life, may be influenced not only by the nature of the effects process itself but also by the nature in which the material is combined during the editing process and it is appreciated that these two activities of effects generation and editing are artistically related.

In this example, computer 101 is a silicon graphics octane and includes a CD ROM drive 106. Application software, providing a graphical user interfaced and image editing functionality is installed from a CD ROM 107.

FIG. 2

Figure 2:
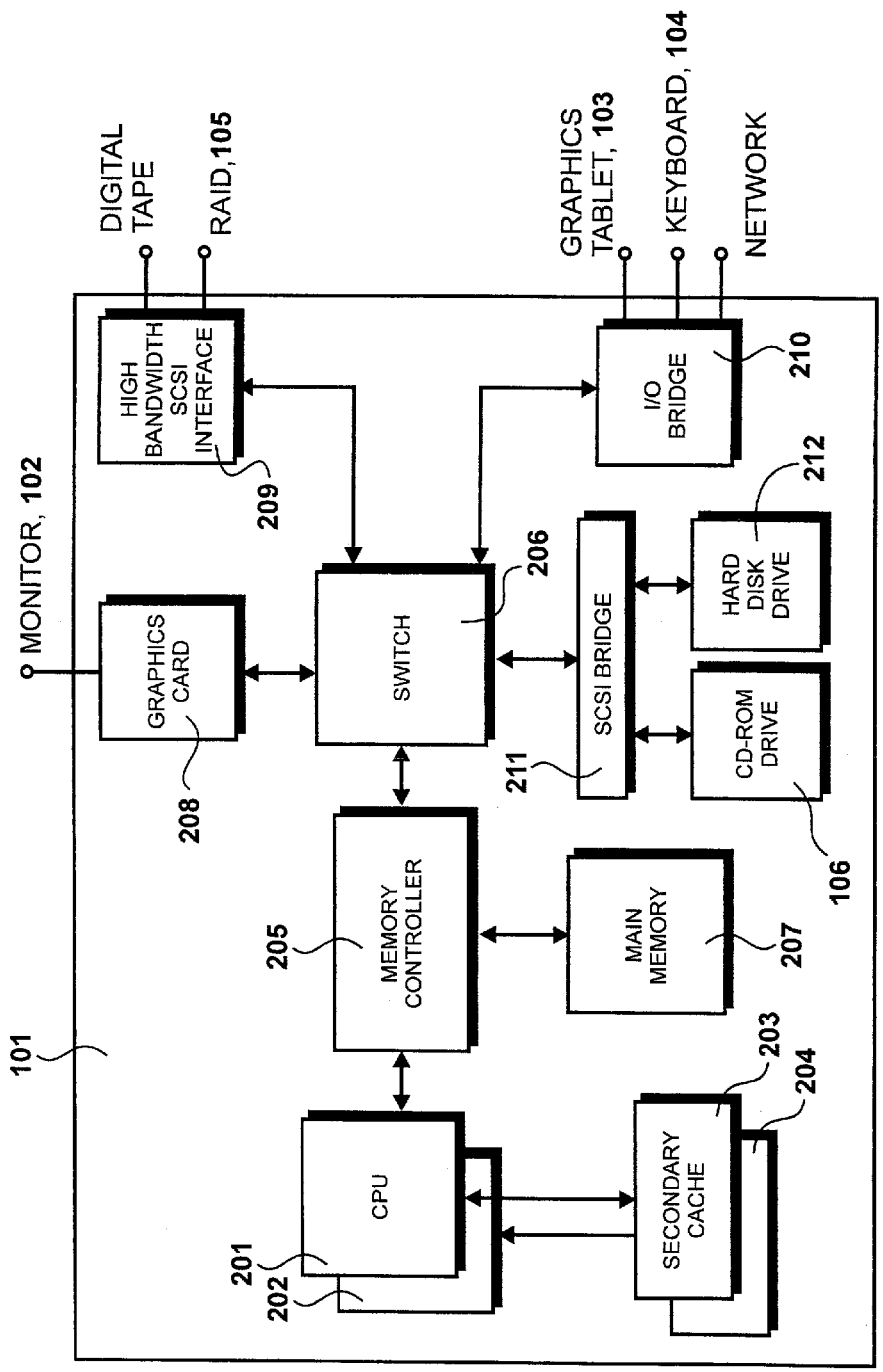
FIG. 2 details a computer system identified in FIG. 1.

Computer system 101 is illustrated in FIG. 2 and includes two MIPS R12000 central processing units (CPU's) 201 and 202, configured to process instructions and data in parallel. Primary cache facilities are provided within each of processors 201 and 202 and in addition each of processors 201 and 202 are equipped with one megabyte of secondary cache 203 and 204. The CPU's 201 and 202 are connected via a memory controller 205 to a switch 206 and a main memory 207, consisting of two gigabytes of dynamic RAM.

Switch 206 enables up to seven different non blocking connections to be made between connected circuits. A graphics card 208 receives instructions from CPU 201 or from CPU 202 in order to render image data and graphical user interface components on display monitor 102. A high bandwidth SCSI bridge 209 allows high bandwidth communication to be made with a digital tape player and framestore 105. An input/output bridge 210 provides input/output interface circuitry for peripherals, including the graphics tablet 103, the keyboard 104 and a network. A second SCSI bridge 211 provides interface connections with an internal hard disk drive 212 providing a capacity of thirteen gigabytes. The second SCSI bridge 211 also provides connections to CD ROM 106, to facilitate the installation of instructions to hard disk 212.

FIG. 3

Figure 3:
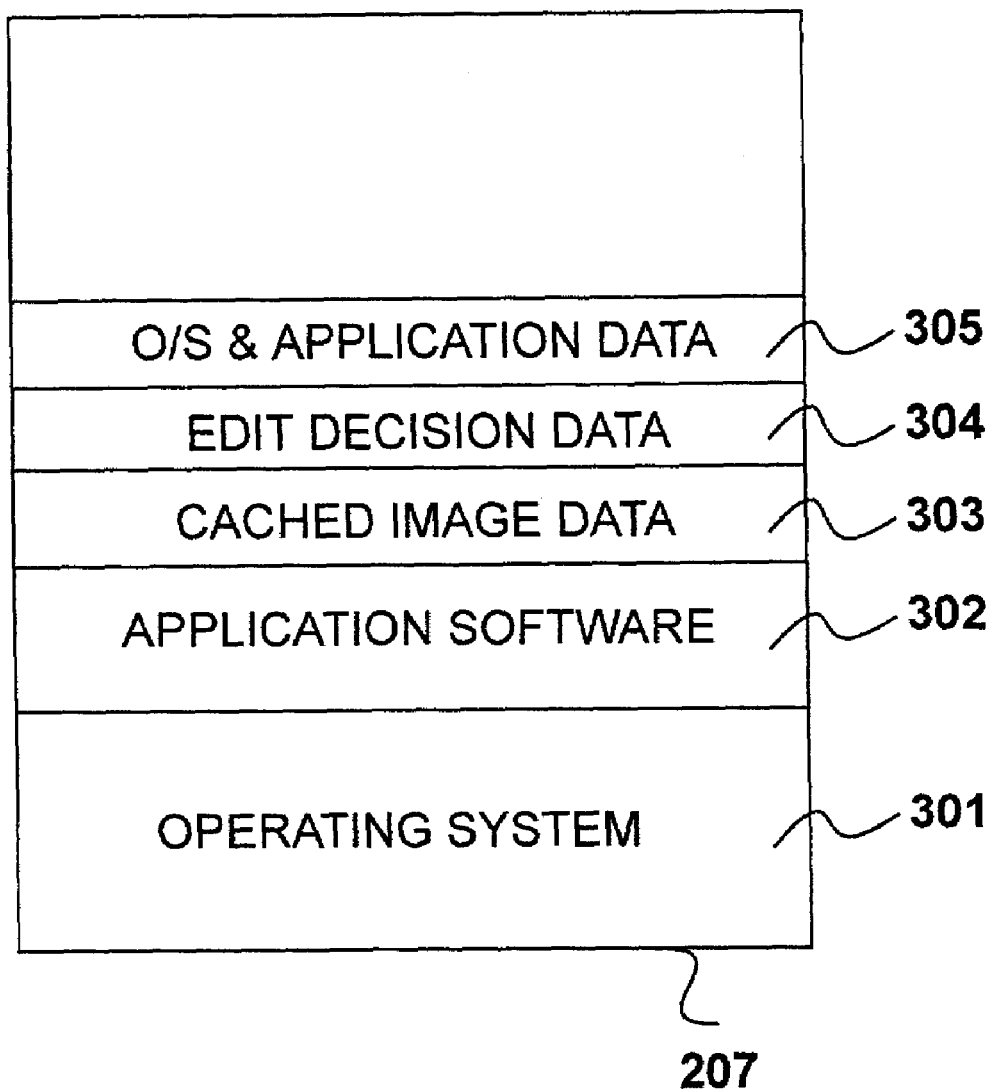
FIG. 3 details a main memory identified in FIG. 2.

Main memory 207 and its data content are illustrated in FIG. 3. The main memory 207 provides storage for an operating system 301 along with an application program 302, providing the graphical user interface and facilitating editing operations. In addition, the main memory 207 also provides storage for various data structures including cached image data 303, edit decision data 304 and other related data 305. The editing process results in the creation of metadata defining how an input sequence is to be made up from stored clips without actually moving the clip data itself.

FIG. 4

Figure 4:
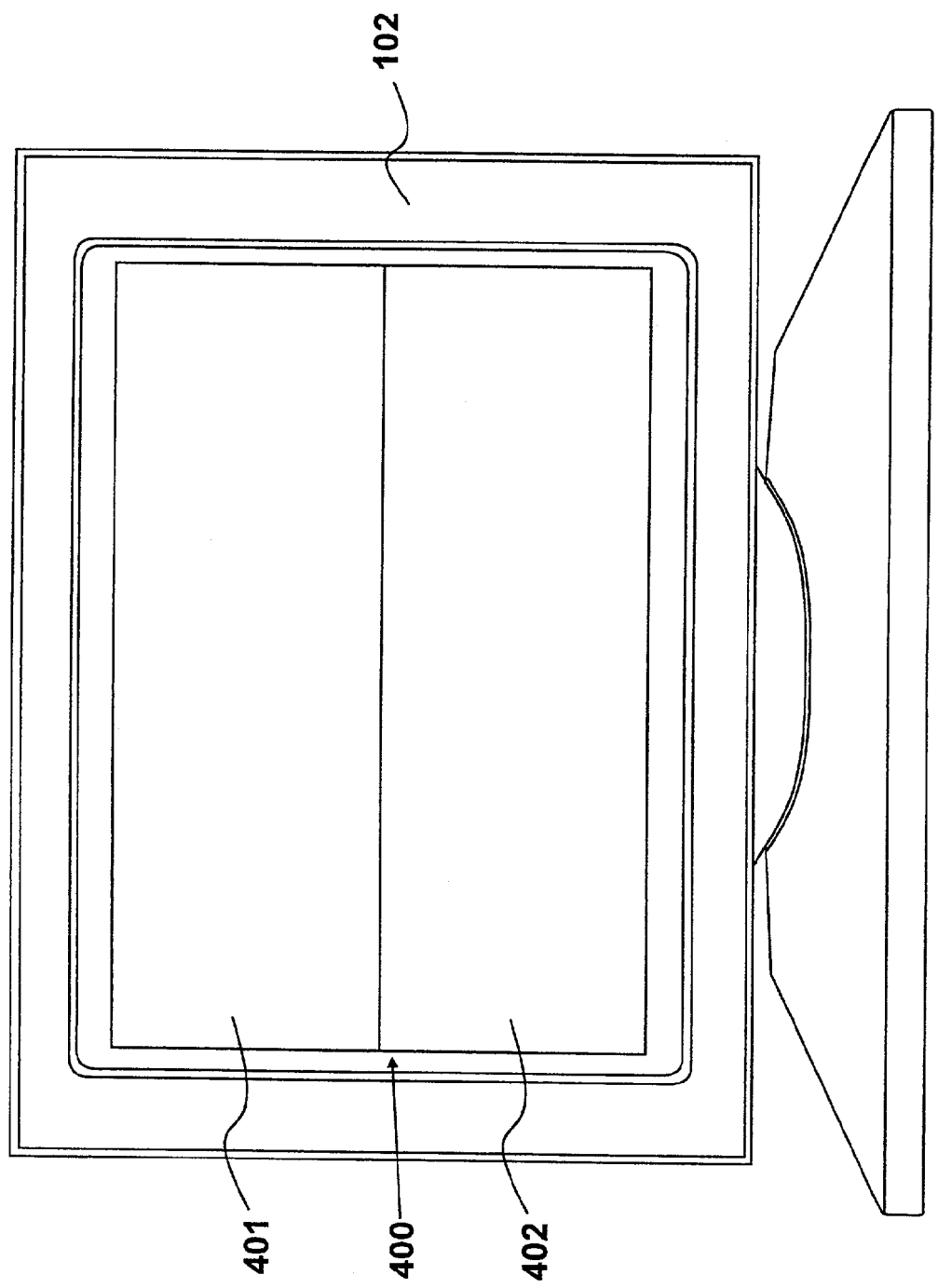
FIG. 4 details a monitor identified in FIG. 1.

Monitor 102 is shown in FIG. 4. In alternative configurations, two monitors may be connected to a computer, allowing editing operations to be displayed on a first monitor (to the left) while effects operations are displayed on a second monitor (to the right). Monitor 102 shown in FIG. 4 may provide the editing (left) monitor type of a two monitor configuration.

A graphical user interface 400 is divided into a first upper tile 401 and a second lower tile 402. The tiles are scalable but are not floating and therefore remain substantially in position thereby ensuring that particular user operable interface commands remain substantially in the same place.

Upper tile 401 is used to display data relating to media management and lower tile 402 is used to display timelines and related information. The interface provided within tile 401 allows media to be selected and moved and identified as belonging to a particular project, by the creation of metadata representing clip libraries etc.

Timelines shown within tile 402 allow edits to be defined. In particular, data is loaded from input reels to define source clips of material. These source clips are established within input timelines with priorities so as to define the actual image frames that would be included within an output sequence.

Input clips may be arranged such that several clips are displayable in parallel. An output is derived exclusively from one of a plurality of clips, or, alternatively, image data from two or more clips is combined so as to generate an effect.

FIG. 5

Figure 5:
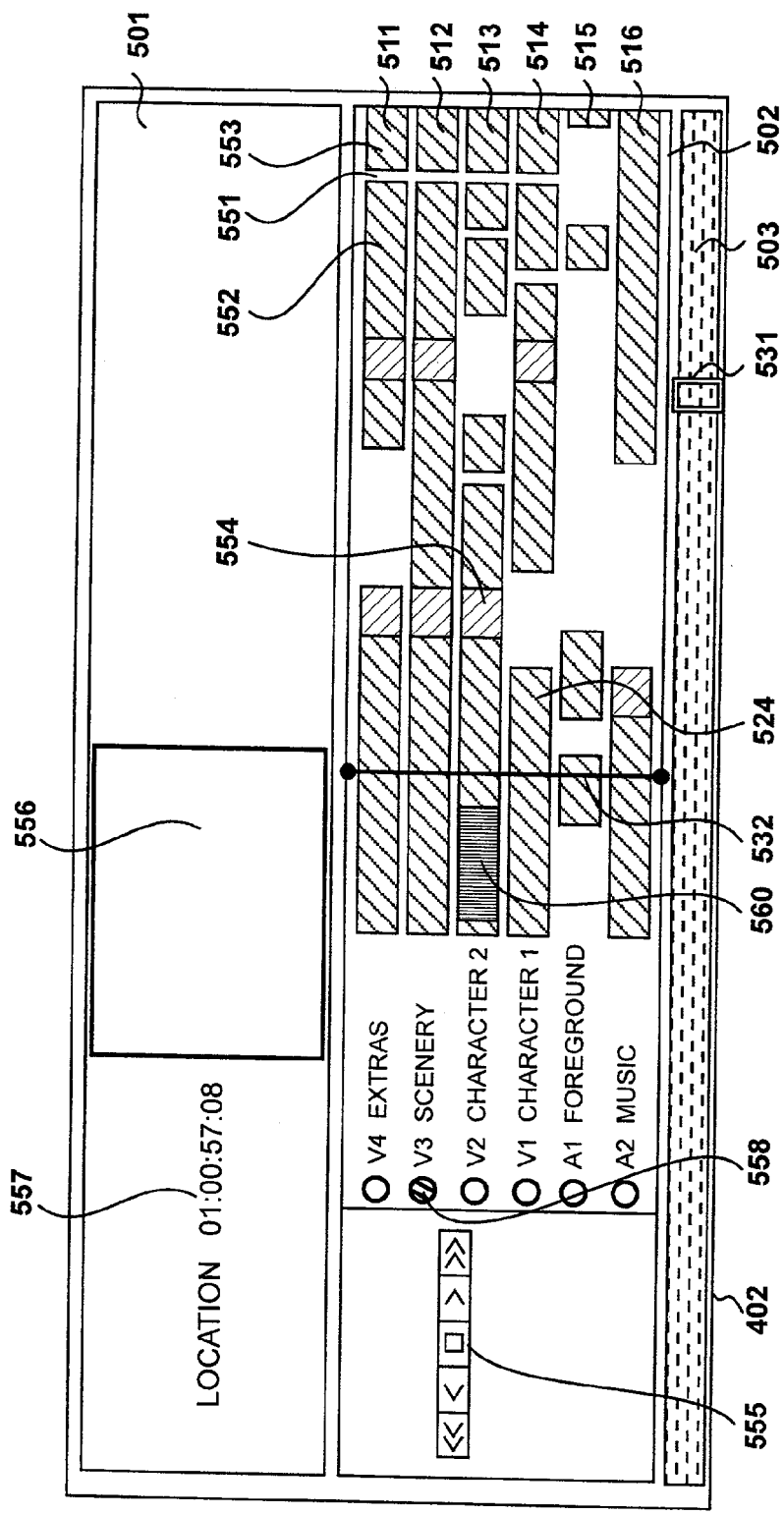
FIG. 5 details a lower tile displayed on the monitor identified in FIG. 4.

An example of editing data displayed within lower tile 402 is shown in FIG. 5. The tile 402 is divided into a first portion 501, a second portion 502 and a third portion 503. The second portion 502 displays conventional timelines in which each of said timelines is processed in parallel to provide an output sequence. In this example, there are six timelines, 511, 512, 513, 514, 515 and 516. Input clips, such as clip 524 representing scenes of a first character are stored in the first video channel represented by timeline 514. Similar clips identifying a second character in a second video channel are stored within timeline 513. Scenery clips are stored within timeline 512 and extras are stored within timeline 511. During a conventional editing process, input clips are dragged from portion 401 and placed within one of the six timelines, thereby building up an output sequence.

Timelines present a graphical representation to an editor as to how edit decisions take place. The scale of the timelines is such that a play back duration of several minutes may be made available. Such a play back duration is desirable for viewing edit decisions but does not allow a representation of the whole of the output sequence to be perceived and does not allow modifications to be made at the individual frame level.

Region 503 is a scroll bar having a length which represents the duration of the output sequence as a whole. A cursor 531 is movable over this bar by operation of the touch tablet, identifying therein a window which is then used to select a portion of the timelines displayed within region 502.

Thus, the first region 503 represents output material of a first duration, preferably the whole duration of the output sequence, while the second region 502 represents a portion of the first region and shows regions representing clips and regions representing transitions between clips in the form of a timeline. Several regions representing clips and transitions between clips are shown in FIG. 5. For example, a simple cut 551 is illustrated by a narrow gap between clips 552 and 553, while a dissolve is identified by a transition edit icon 554 on timeline 513. In addition, effects icons such as icon 560 are displayed on the timelines showing the position of effects applied to the clips.

Region 502 includes tape transport controls 555, operable by the graphics tablet, which have "play", "stop", "reverse", "fast forward" and "rewind" buttons. Region 502 also has a timeline cursor 532 which, after selection of a play operation, possibly using tape transport controls 555, traverses across the screen at frame rate. During play operation, while the cursor 531 moves along the timelines, an area 556 of region 501 displays a moving image representing the composite video output. The moving image is such that at any point in time the area 556 displays a frame identified by a displayed time code 557 and represented by the position of cursor 532 on the timelines.

When play back is stopped, the cursor 532 resides at a particular frame location such that a full frame is present on its left side and a full frame is present on its right side. These individual frames, on either side of timeline cursor 532, may be displayed within a third region 501 such that said third region represents a portion of the second region 502. As an alternative to displaying two adjacent frames, other frames may be displayed within region 501, as will be described below, but as such these still represent a portion of the frames displayed within the second region 502.

Therefore, first region 503 shows the representation of the entire output sequence. Second region 502 displays a portion of the first region and places emphasis on the transitions between clips. A portion of the second region is then displayed within the third region 501 which may allow individual frames to be viewed or alternatively, a moving image. Thus, within a relatively small display region it is possible for an editor to be presented with an overall view of the sequence, a view showing clip transition and a view showing effects upon individual frames.

In addition to displaying individual frames within region 501, it is also possible for modifications to be selected and controlled based on the images displayed within region 501.

The user interface 400 provides an environment in which clips located on the timelines may be edited and effects may be applied to the timelines. In order to facilitate these operations, the user is able to specify a particular timeline to the system as being the timeline to which editing and/or effects operations are to be applied using the graphics tablet 103 or the keyboard 104. I.e. the user is able to specify a particular timeline as the active timeline. On receiving an indication that a specific timeline is to be the active timeline, the user interface 400 indicates the specified timeline by a marker. For example, in FIG. 5 a marker 558 indicates that timeline 512 has been selected as active.

Particular operations performed within region 501, are generally with reference to individual frames. These operations are user selectable. However, in addition, default tools that are dependent upon the state of the system are selected by the system for presentation within region 501. Specifically, the default tools that are presented in region 501 are context sensitive in that if the cursor 532 is located, i.e. motionless at a particular position, such that the cursor 532 lies within a clip on the active timeline, it is assumed by the system that an effect is to be modified and region 501 displays images and tools to facilitate effect modification. Similarly, if the cursor 532 is located at a position on the currently active timeline that corresponds to a transition edit, it is assumed that the nature of the transition is to be modified and the system displays default tools relevant to the modification of that transition.

The cursor 532 may be located at a particular position on the active timeline in a number of different ways, each of which will affect the default tool display in region 501. Firstly, during the play-back operation, in which moving images are presented in region 501, the play may be stopped, by, for example, the user activating the stop button of the tape transport controls, and thus the cursor 532 will be stopped and located at a particular position; secondly, the user may move the cursor, using tape transport controls such as "fast forward" or "rewind", or drag the cursor 532 using the graphics tablet etc. and locate it at a new position; thirdly, the user may select a different timeline as the active timeline and thus the cursor 532 becomes located at a particular position on the newly active timeline.

In terms of modifying editing parameters, a group of operations related to transition edits are identified. In this example, these consist of the following:

Transition Editing Functions
 1. Edit point selection (for a simple cut).
 2. Dissolve parameters.
 3. Wipe parameters.

Similarly, effects operations in this example may be summarised as follows:

Effects Parameters
 1. Colour correction
 2. Page peel
 3. Pixelation
 4. Gamma adjustment

FIG. 6

Figure 6:
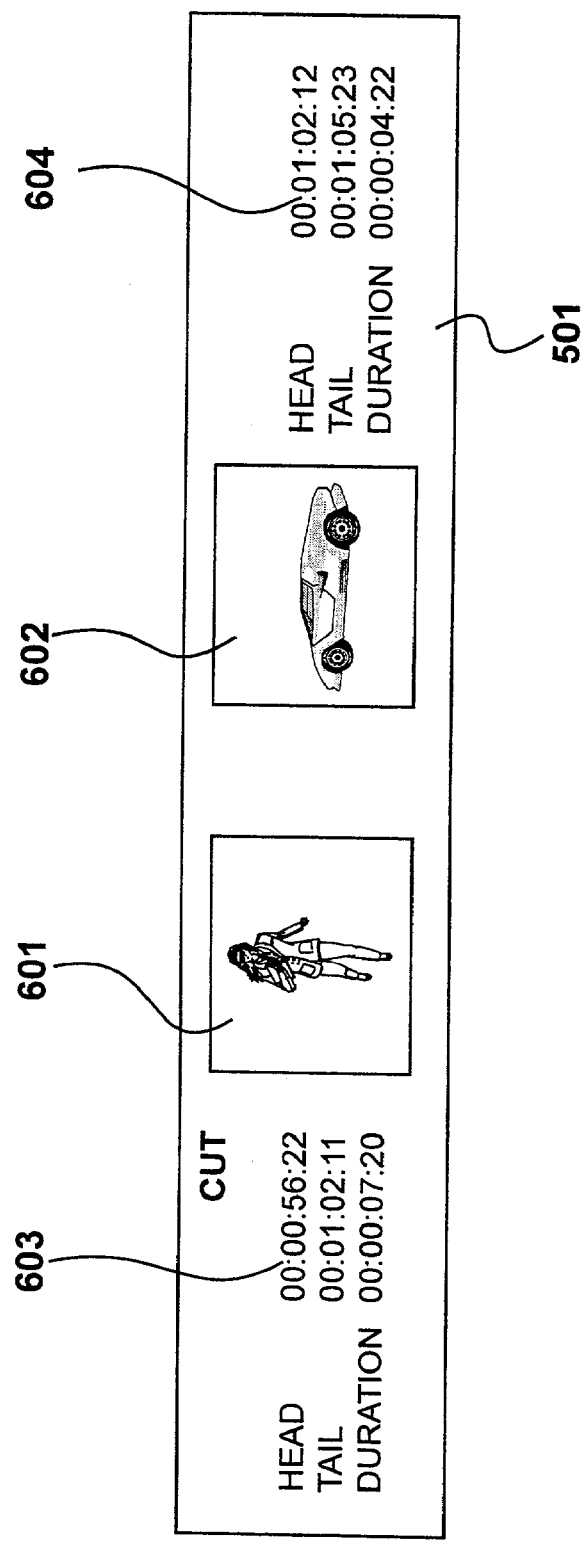
FIG. 6 illustrates images displayed for a cut.

An example of images displayed in region 501 when the timeline cursor is located at a cut is illustrated in FIG. 6. The cut represents an abrupt transition from a first image 601 in a first clip to a second image 602 in a second clip. Data 603 is also displayed representing time codes for the first clip in terms of the position of the start of its head, the position of the start of its tail and its overall duration. Consequently, these parameters may be modified in order to adjust the actual position of the clip while viewing individual frames at the transition point. Corresponding data 604 displayed for the second clip is adjustable in a similar manner. In this way, it is possible to accurately define the position of an edit (in this case a cut) while timeline data, in display portion 502, remains present. Thus, an editor may rapidly move between operations to define edit points either at the high magnification frame level, displayed in portion 501, or at the timeline level displayed within portion 502. Consequently, this provides an enhancement both in terms of speed of editing and the quality of editing.

FIG. 7

Figure 7:
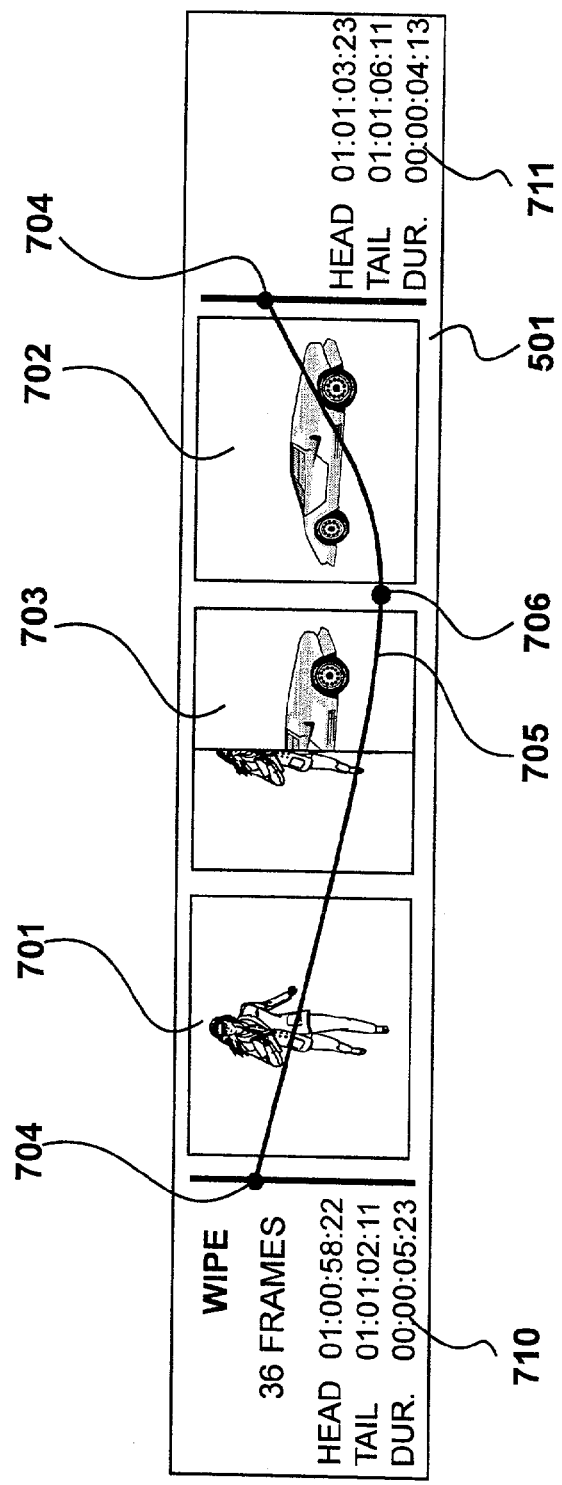
FIG. 7 illustrates images displayed for a wipe.

In the event that the timeline cursor 532 is located at a transition edit icon, or the user of the system uses the graphics tablet 103 to identify a particular transition edit icon, then default tools relevant to the transition are presented in region 501. An example, showing default tools displayed within region 501 for a wipe, is illustrated in FIG. 7. In addition to data 710 and 711 representing the starts of heads and tails as shown in FIG. 6, images are displayed showing a frame 701 from a first clip and a frame 702 from a second clip. In addition, an example of an intermediate wipe image 703 is also displayed. Again, this provides a frame by frame analysis of the wipe allowing minor modifications to be made without losing the overall timeline information.

Region 501 also displays duration controllers 704, which may be manipulated in order to adjust the duration of the wipe, and an acceleration control curve 705 containing a control point 706 which may be manipulated in order to adjust the varying speed at which the wipe occurs. For example, the wipe may be adjusted so that it starts slowly and gets faster towards its completion.

FIG. 8

Figure 8:
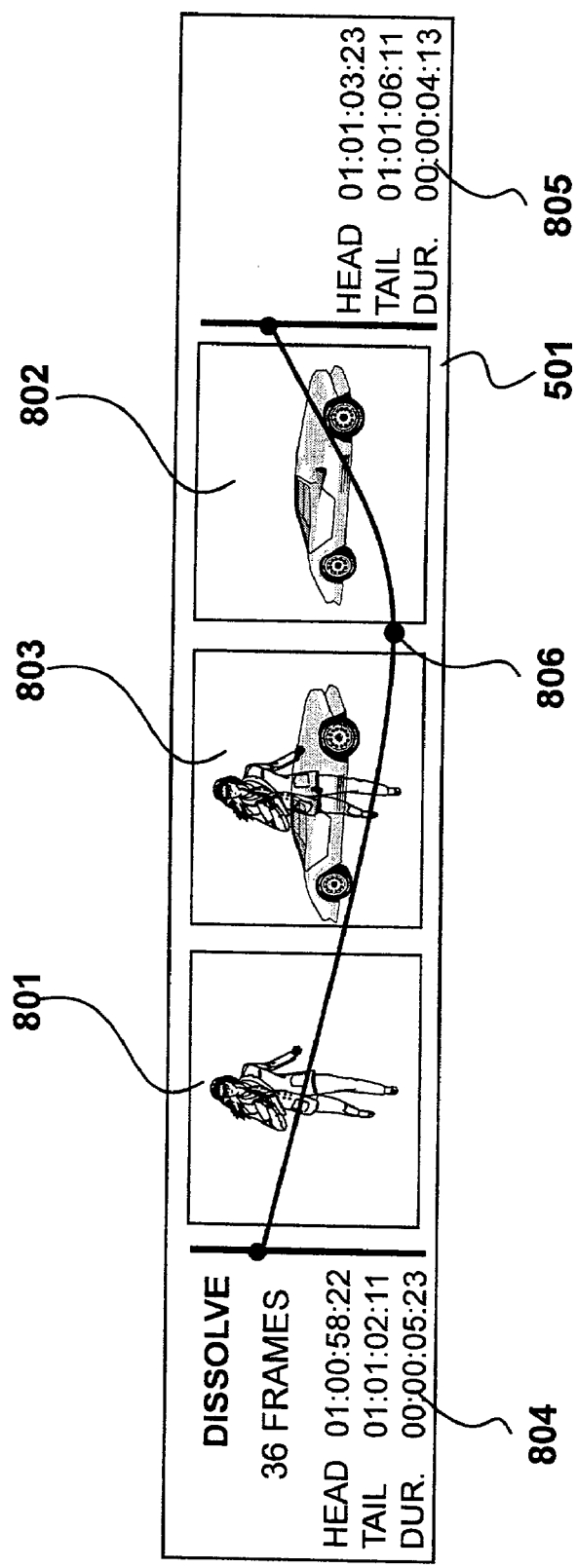
FIG. 8 illustrates images displayed for a dissolve.

An example, showing default tools displayed within region 501 for a dissolve is shown in FIG. 8. Thus again, within region 501 there is a first clip of the dissolve represented by frame 801, a second clip of the dissolve represented by frame 802 and an intermediate frame 803 showing a frame taken from the dissolve edit effect. Again, editable parameters 804 and 805 are displayed along with graphically displayed tools 806 to facilitates fine tuning of a dissolve while remaining within the editing environment.

FIG. 9

Figure 9:
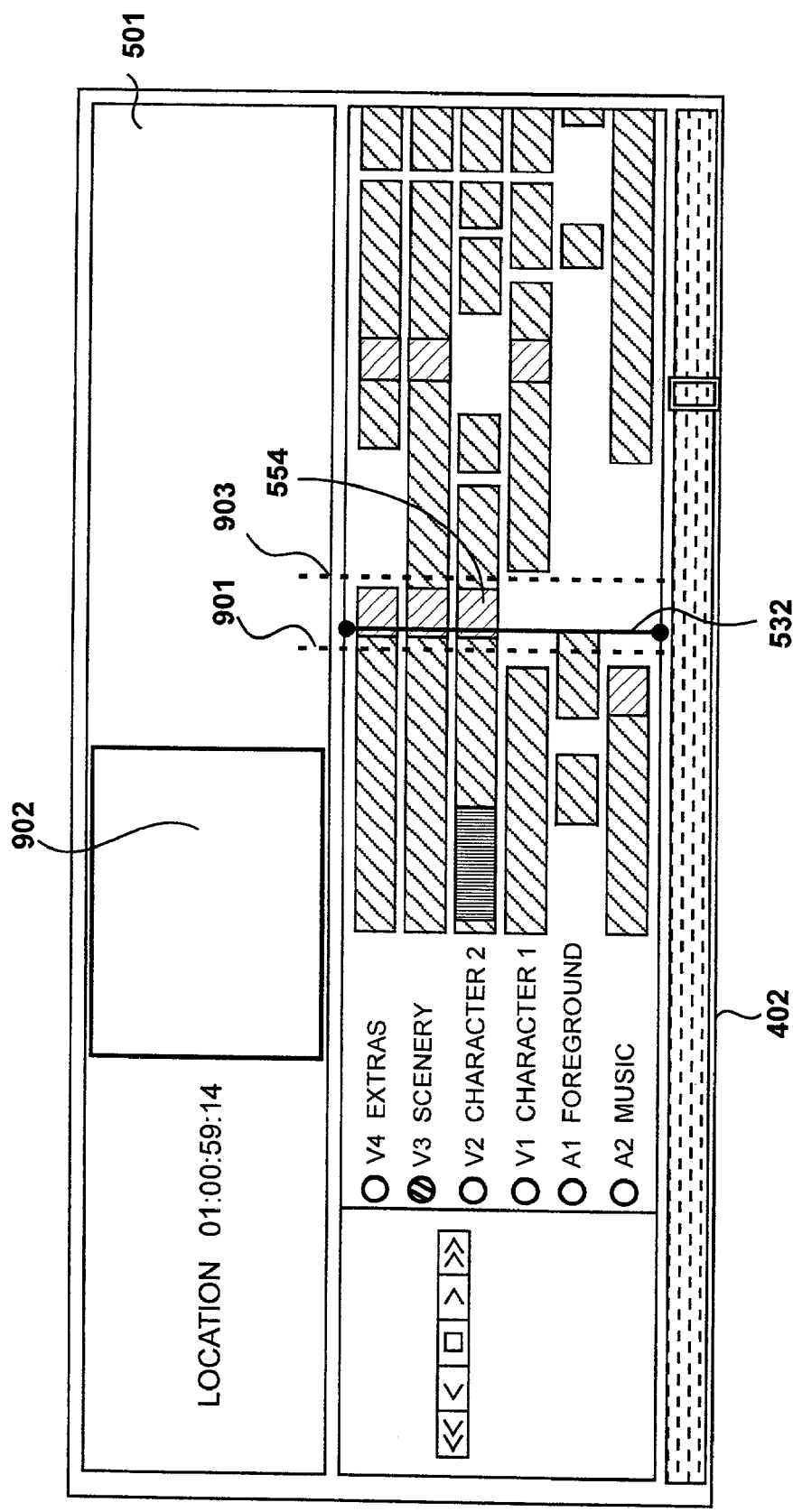
FIG. 9 illustrates the effect of a user selecting the play button during the editing of a transition.

Tile 402 of FIG. 4 is shown in detail again in FIG. 9, to illustrate the effect of a user selecting the play button during the editing of a transition, such as those described with respect to FIGS. 6, 7 and 8. On selection of the play button, the cursor 532 is moved by the system to a position corresponding to a calculated period before the transition or effect commences. In the present embodiment, the calculated period is the greater of 15% of the transition duration and 1 second. For example, if play back is selected during the editing of transition 554, the cursor is moved to a position illustrated by dashed line 901.

The cursor 532 then proceeds to move rightwards at frame rate while corresponding output video images 902 are displayed within region 501. The output images continue to be displayed until the cursor 532 has moved to a position which is a calculated period after the end of the transition. In the present embodiment, the second calculated period is also the greater of 15% of the transition duration and 1 second. Thus, in the case of transition 554, cursor 532 moves rightwards until it reaches a position indicated by dashed line 903.

On completion of the playing of the output corresponding to the transition, the cursor 532 is moved by the system back to a stationary position over the transition, and region 501 resumes the display of the relevant transition editing images and tools, as shown in FIGS. 6, 7 and 8.

In summary of FIG. 9, during editing of a transition, if play back is selected, the system displays an output sequence which includes the transition and which has a duration dependent upon the duration of the transition.

FIG. 10

Figure 10:
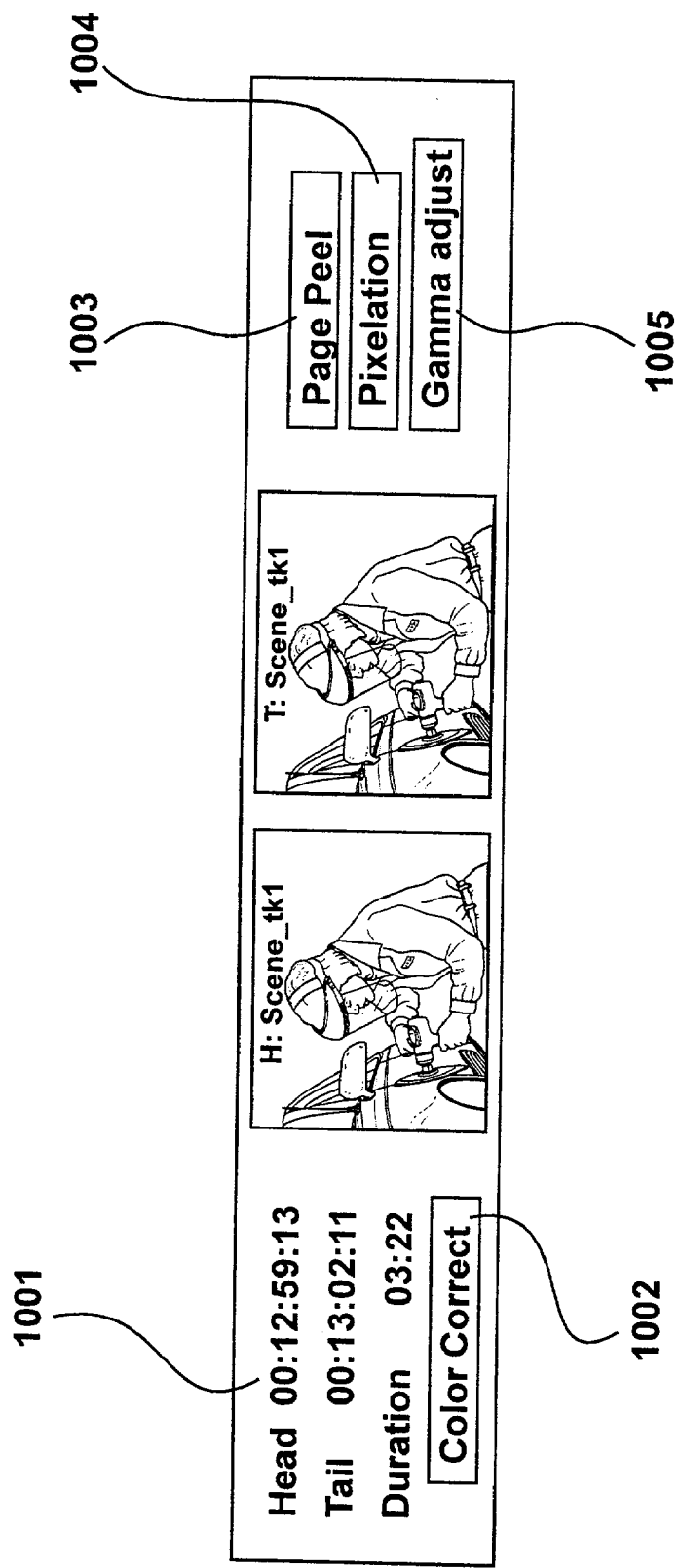
FIG. 10 illustrates images displayed for effect modification.

The locating of the cursor 532 at a position within a clip calls an effects default interface, as illustrated in FIG. 10, to facilitate the modification of effect parameters. Clip data 1001 shows the position of the head for the clip, the position of the start of the tail for the clip and the duration of the clip. Thus, in this example, the clip has a duration of three seconds and twenty two frames. From this screen, modifications to colour correction may be made by selecting soft button 1002. Similarly, a selection of soft button 1003 allows a page peel effect to be modified, a selection of soft button 1004 allows a pixelation effect to be modified and a selection of soft button 1005 allows gamma adjustment to be modified.

FIG. 11

Figure 11:
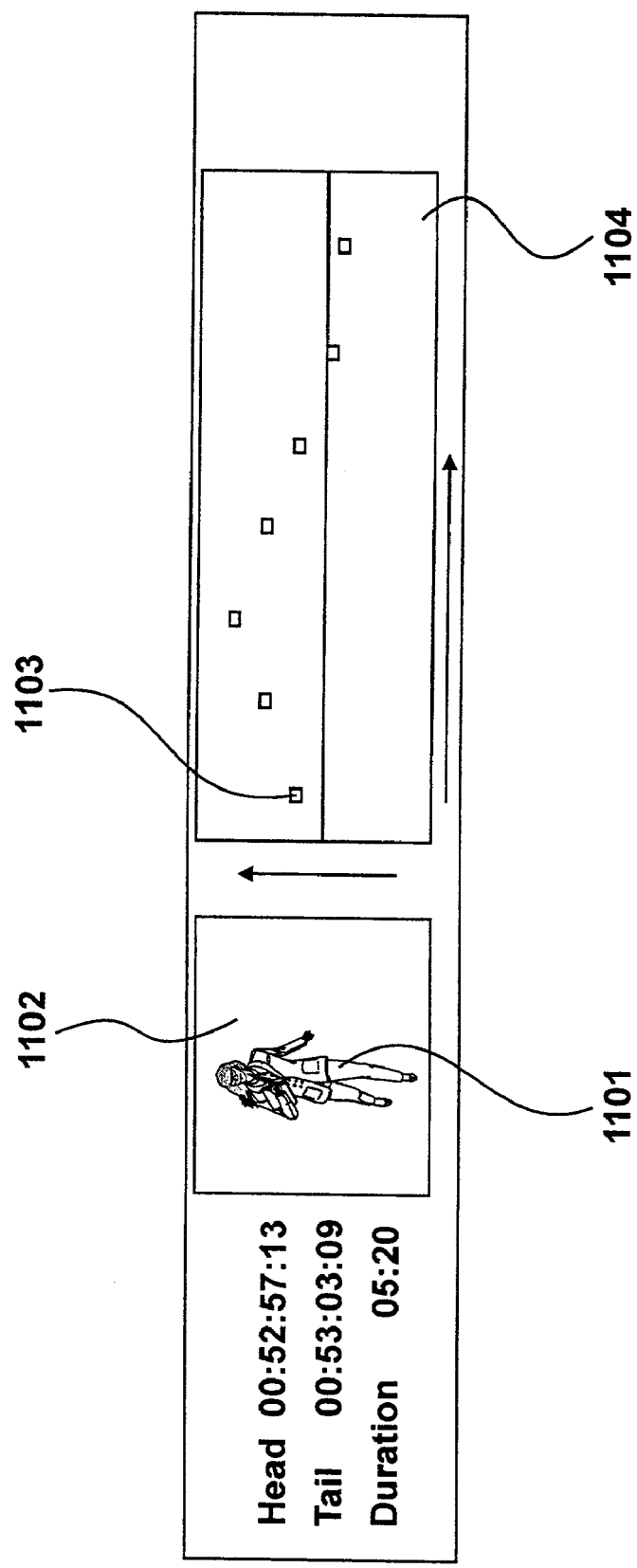
FIG. 11 illustrates images displayed for X,Y spatial modification.

In addition to the effects modification screen shown in FIG. 10, a further modification screen may be selected. As illustrated in FIG. 11, this provides for a spatial animation in the X,Y plain to be modified, relying on two input source clips. A first clip, representing a foreground object 1101 is derived from a first clip and is superimposed upon a background 1102 derived from a second clip. The position of the object 1101 may be modified on a frame by frame basis as defined by key frame locations 1103. Thus, within the displayed representation of 1104 of key frames, key frame locations 1103 may be modified by the editor in response to operation of the graphics tablet 103.

Figure 12:
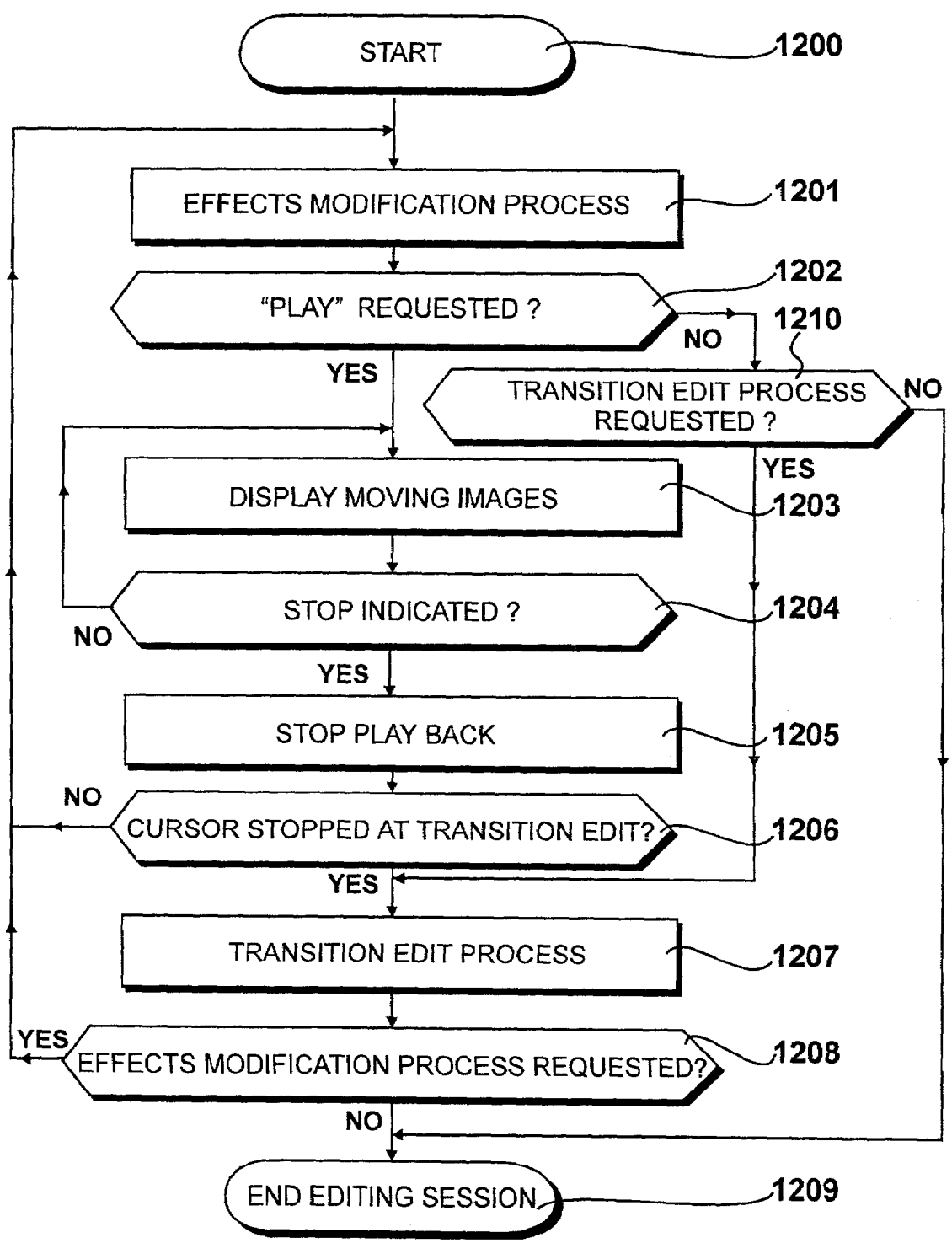
FIG. 12 shows the operation of the system during editing and effects modification.
Figure 13:
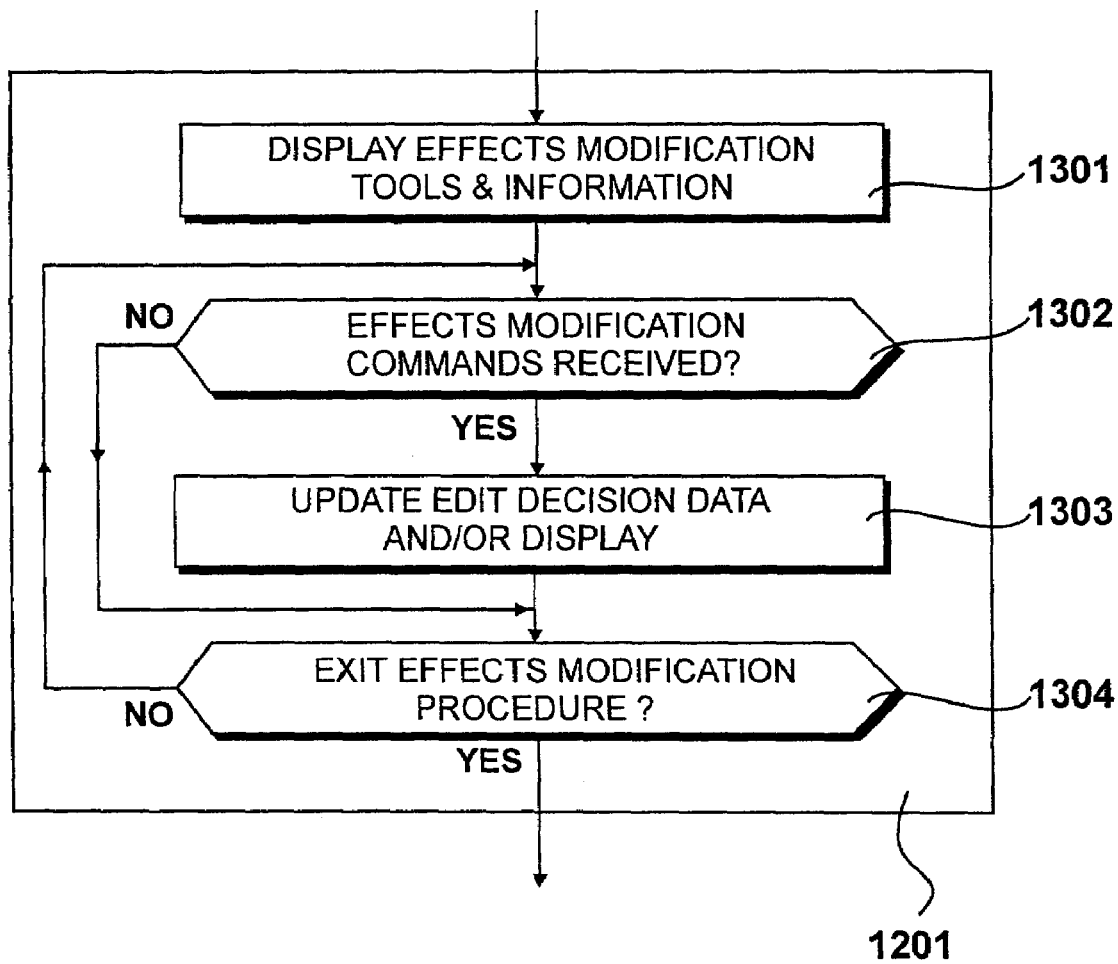
FIG. 13 shows the effects modification procedure of FIG. 12 in further detail.
Figure 14:
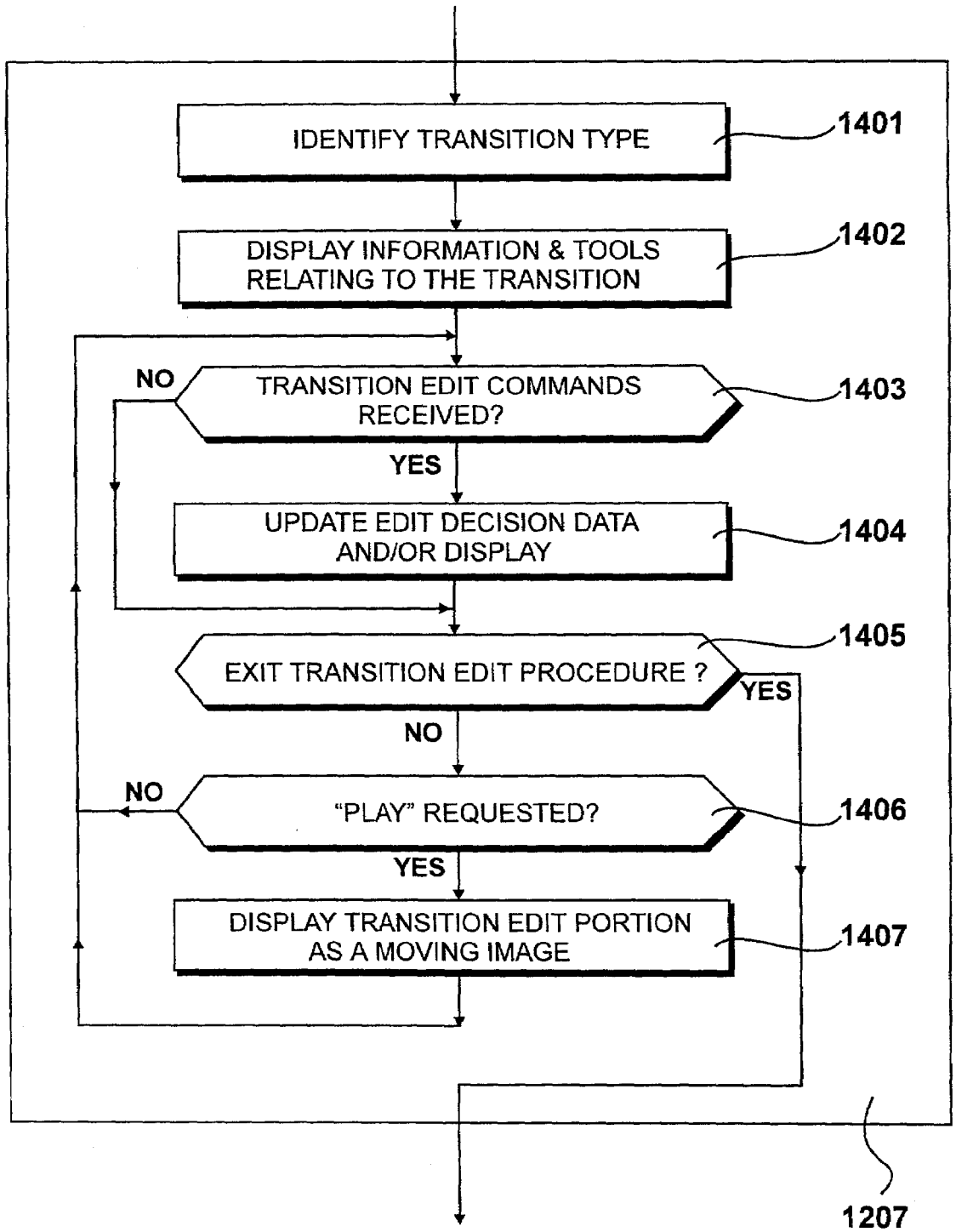
FIG. 14 shows the transition edit procedure of FIG. 12 in greater detail.

FIGS. 12, 13 and 14

Flow charts illustrating the contextual manner in which the system displays editing and effects tools are shown in FIGS. 12, 13 and 14. An outline of the operation of the system during editing and effects modification is shown in FIG. 12. Initially, on commencing effect/ transition editing at step 1200, the system enters an effects modification procedure at step 1201, in which tools and relevant data are presented to the user and the system receives user inputs in respect of effect modifications. On leaving step 1201, the system determines at step 1202, whether a user input has been received that indicates that a play-back of the output sequence has been requested. If the question at step 1202 is answered yes, then the system enters step 1203 in which moving images corresponding to the output sequence are displayed. At step 1204 the system determines whether a user input has been received that indicates that the play back should be stopped. If the answer to this is "no", the process returns to step 1203 and the output sequence display is continued. Alternatively, if it is determined at step 1204 that play back should be stopped, the play back is stopped at step 1205. At step 1206, it is then determined whether the cursor stopped at a transition edit. If the answer to this is "no" the process returns to step 1201 and the effects modification procedure is re-entered.

If it is determined at step 1206 that the cursor stopped at a transition edit, and so it is now located at a transition edit, the process enters the transition edit procedure at step 1207. On leaving step 1207 the system determines whether further effects modification has been requested by the user at step 1208. If this is so, then the process returns to step 1201 where the effects modification procedure is re-entered. If step 1207 finds that a requirement for effects modification has not been indicated, then the present session of the effects/transition editing is ended at step 1209.

If the system determines at step 1202 that play-back has not been requested, it is determined at step 1210 whether user inputs have been received which indicate that transition editing is required. If transition editing has been requested, then the process enters step 1207 in which transition editing may take place. If it is determined at step 1210 that editing is not required then the effects/ transition editing session is ended at step 1209.

The effects modification procedure of step 1201 is shown in further detail in the flow chart of FIG. 13. On entering step 1201 an effects modification interface is displayed at step 1301. In the present embodiment this is exemplified by an effects menu displayed in region 501 as illustrated in FIG. 10. The process then enters step 1302 where the system determines whether effect modification commands have been received at the graphics tablet or keyboard. If not, then the process enters step 1304 directly, otherwise it enters step 1303 before step 1304. At step 1303, the edit decision data 304 is updated and/or the display is updated accordingly. For example, if the system receives commands indicating that gamma correction is required, then the display is updated to provide relevant tools on the graphical user interface within region 501, or alternatively, if the system receives commands indicating that a specific parameter of an effect is to be amended, then the edit decision data is updated accordingly.

At step 1304 a question is asked as to whether inputs have been received indicating that effects modification procedure should be exited. This indication may take one of several forms including: inputs indicating that the cursor 532 should moved so that it is located at a transition on the active timeline (e.g. by dragging the cursor); inputs indicating the selection of a transition edit icon; inputs indicating that the active timeline should be changed, resulting in the cursor 532 being located at a transition; and inputs indicating that play-back of the output sequence is required. If the question asked at step 1304 is answered "no" then step 1302 is re-entered and effects modification continues. Alternatively, if the question at step 1304 is answered "yes", then step 1201 is completed and the process enters step 1202.

The transition edit procedure of step 1207 is shown in greater detail in the flow chart of FIG. 14. On entering step 1207 the process enters step 1401 where the transition type which is to be edited is identified. Generally, the transition to be edited is located at the cursor 532 and on the active time, and so the nature of this transition is determined. I.e. whether it is a cut, a wipe, a dissolve etc. At step 1402 information and tools relating to the transition are displayed in region 501, for example as shown in FIGS. 6, 7 or 8. Then, at step 1403 it is determined whether transition edit commands have been received at input devices such as the graphics tablet 103 or the keyboard 104. If not then step 1405 is entered directly, otherwise the process enters step 1404 before step 1405. At step 1404 the stored edit decision data 304 is updated and/or the display is updated.

At step 1405 it is determined whether inputs have been received indicating that the transition edit procedure should be exited. This indication may take one of several forms including: inputs indicating that the cursor should be moved to a position so that it is no longer located on a transition (e.g. moved to the middle of a clip); and inputs indicating that a different timeline should become the active timeline and such that the cursor is no longer located on a transition on the active timeline. If it is determined at step 1405 that exit from the transition edit procedure is not required then step 1406 is entered.

At step 1406 it is determined whether play-back of the output sequence has been requested by the user. If this is so, then the transition edit portion of the output sequence is displayed at step 1407, as described with reference to FIG. 9, before the process re-enters step 1403. Alternatively, if it is determined that play back has not been requested at step 1406 then the process enters step 1403 directly.

If it is determined at step 1405 that exit of the transition edit procedure is required by the user, then step 1207 is completed.

The system therefore provides a graphical user interface which allows a user to perform editing of clips and also apply/ modify effects. Furthermore, it provides a display of tools which is context sensitive, in that transition editing tools or effects modification tools are displayed in dependence upon the location of the timeline cursor.

The invention claimed is:

1. Image data editing apparatus, comprising frame storage means storing a plurality of clips, processing means, manually operable input means and display means, wherein said display means is configured to display:
   (a) a first region in which a plurality of said clips representing an output sequence are represented by clip regions on a timeline, and transitions between said clips are represented by edit regions;
   (b) a timeline cursor configured to be moveable over said timeline,
   (c) a second region representing input controls, wherein said controls relate to transition operations when said timeline cursor is located over an edit region, and said controls relate to other functions not including said transition operations when said timeline cursor is not located over an edit region.

2. Image data editing apparatus according to claim 1, wherein said second region represents a portion of said first region and shows individual frames of said output sequence.

3. Image data editing apparatus according to claim 1, wherein said display means is configured to move said timeline cursor over said timeline when said output sequence is being played, and said timeline cursor is located when said output sequence stops being played.

4. Image data editing apparatus according to claim 3, wherein said output sequence is stopped by inputs received at said manually operable input means.

5. Image data editing apparatus according to claim 1, wherein said timeline cursor is moved and located in response to inputs received at said manually operable input means.

6. Image data editing apparatus according to claim 1, wherein said first region comprises a plurality of timelines; said apparatus is configured to receive a manual input identifying a selection of one of said timelines, and said timeline cursor is located by said selection of one of said timelines.

7. Image data editing apparatus according to claim 1, wherein said manually operable input means are arranged to receive inputs indicating that display of said output sequence is required, and said display means are arranged to display said output sequence in dependence of receiving said inputs, such that if said timeline cursor is located at a transition when said input is received only a portion of said output sequence which has a duration dependent upon the duration of the transition and which comprises said transition is displayed.

8. Image data editing apparatus according to claim 1, wherein said controls relating to transition operations includes controls for cut positions, dissolve parameters or wipe parameters.

9. Image data editing apparatus according to claim 1, wherein said controls relating to other to other functions comprises controls to modify effects.

10. Image data editing apparatus according to claim 1, wherein said controls to modify effects includes controls for gamma adjustments.

11. A method of editing image data comprising the steps of:
   storing a plurality of clips in a frame storage means;
   receiving manually generated inputs; and
   displaying
   (a) a first region in which a plurality of said clips representing an output sequence are represented by clip regions on a timeline, and transitions between said clips are represented by edit regions;
   (b) a timeline cursor configured to be moveable over said timeline,
   (c) a second region representing input controls, wherein said controls relate to transition operations when said timeline cursor is located over an edit region, and said controls relate to other functions not including said transition operations when said timeline cursor is not located over an edit region.

12. A method of editing image data according to claim 11, wherein said second region represents a portion of said first region and shows individual frames of said output sequence.

13. A method of editing image data according to claim 11, comprising the steps of:
   moving said timeline cursor over said timeline while displaying a play back of said output sequence;
   and stopping said play back of said output sequence so that said timeline cursor is located at a position on said timeline.

14. A method of editing image data according to claim 13, wherein said output sequence is stopped in dependence of receiving said manually generated inputs.

15. A method of editing image data according to claim 11, wherein said timeline cursor is moved and located in response to received manually generated inputs.

16. A method of editing image data according to claim 11, wherein said first region comprises a plurality of timelines; and said method comprises the steps of:
   receiving a manual input identifying a selection of one of said timelines; and
   identifying said timeline cursor as being located at an edit region in response to receiving said manual input identifying a selection of one of said timelines.

17. A method of editing image data according to claim 11, comprising the steps of:
   receiving inputs indicating that display of said output sequence is required; and
   displaying said output sequence in dependence of receiving said inputs, such that if said timeline cursor is located at an edit region when said input is received only a portion of said output sequence which has a duration dependent upon the duration of the corresponding transition and which comprises said transition is displayed.

18. A computer-readable medium having computer-readable instructions executable by a computer such that, when executing said instructions, a computer will perform the steps of:
   storing a plurality of clips in a frame storage means;
   receiving manually generated inputs; and
   displaying:
   (a) a first region in which a plurality of said clips representing an output sequence are represented by clip regions on a timeline, and transitions between said clips are represented by edit regions;
   (b) a timeline cursor configured to be moveable over said timeline,
   (c) a second region representing input controls, such that said controls relate to transition operations when said timeline cursor is located over an edit region, and said controls relate to other functions not including said transition operations when said timeline cursor is not located over an edit region.

19. A computer-readable medium according to claim 18, such that when executing said instructions, a computer will perform the steps of:
   moving said timeline cursor over said timeline while displaying a play back of said output sequence; and
   stopping said play back of said output sequence so that said timeline cursor is located at a position on said timeline.

20. A computer-readable medium according to claim 18, such that when executing said instructions, a computer will perform the steps of:
   moving said timeline cursor in response to received manually generated inputs, so that said timeline cursor is located.

* * * * *